Patented Oct. 5, 1954

2,691,030

UNITED STATES PATENT OFFICE 2,691,030

11α-HYDROXY-6-DEHYDROPROGESTERONE AND ESTERS THEREOF

Herbert C. Murray, Hickory Corners, and Durey H. Peterson, Kalamazoo, Mich., assignors to The Upjohn Company, Kalamazoo, Mich., a corporation of Michigan No Drawing. Application March 28, 1952, Serial No. 279,217

7 Claims. (Cl. 260—397.45)

This invention relates to novel 11α-hydroxy-6-dehydroprogesterones and its esters and to a novel process for the production thereof.

The novel esters are prepared from the novel 11α-hydroxy-6-dehydroprogesterone which in turn is prepared from 6-dehydroprogesterone of Wettstein, Helv. Chim. Acta, 23, 388 (1940) as described in our applications, of which this is a continuation-in-part, Serial No. 180,496, filed August 19, 1950, now abandoned, and Serial No. 272,944, filed February 23, 1952, now Patent 2,602,769, issued July 8, 1952, or as described in the preparation and examples in this specification.

It is an object of this invention to provide the novel 11α-hydroxy-6-dehydroprogesterone and esters thereof. Another object is the provision of a novel process for the production of 11α-acyloxy-6-dehydroprogesterones. Other objects will become apparent to those skilled in the art to which this invention pertains.

The compounds of the present invention have pharmacological activity and utility in the synthesis of cortisone and other 11-oxygenated steroids. Hydrogenation of the double bonds in the ester, followed by saponification, and oxidation of the 11-hydroxy group to an 11-keto group is productive of the known pregnane-3,11,20-trione. Hydrogenation of the double bonds of 11α-hydroxy-6-dehydroprogesterone followed by oxidation likewise produces pregnane-3,11,20-trione.

The 11α-hydroxy-6-dehydroprogesterone and esters thereof may be represented by the structural formula:

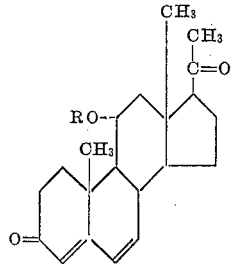

wherein R is hydrogen or acyl.

In carrying out the process of the present invention, the starting 11α-hydroxy-6-dehydroprogesterone is admixed with an acylating agent such as, for example, ketene, a ketene of a selected acid, an acid, acid chloride or acid anhydride, or other known acylating agent, usually in a solvent such as, for example, pyridine or the like, or in an inert solvent including solvents like benzene, toluene, ether and the like, and heated at a temperature between about zero degrees centigrade and the boiling point of the reaction mixture, usually about room temperature, for a period between about a half-hour and about 96 hours. The time of reaction may be varied according to the temperature at which the reaction is carried out, the particular acylating agent utilized and the ratio of reactants used. The reaction mixture is suitably cooled with ice or cold water, the product collected in an appropriate solvent which is thereafter washed with successive portions of a mildly basic solution and water to obtain a solution of the product which is essentially neutral. In some instances, the product may crystallize from the reaction mixture, in which case it may be advantageous to separate the product by filtration or other means, wash with water, and thereafter purify by conventional means, such as, for example, by crystallization from a suitable solvent or by chromatographic purification, as deemed necessary. The novel compounds of the present invention have been found to exhibit thermal stability. Moreover, the esters of the present invention are stable readily purifyable forms of the corresponding 11α-hydroxy-4,6-pregnadiene-3,20-dione, being resistant to oxidation and thermal decomposition. The 11α-hydroxy-6-dehydroprogesterone and 11α-acyloxy-6-dehydroprogesterones demonstrate pronounced anaesthetic and inhibitory properties in estrogen, luteoid, testoid, hypertensive, folliculoid, spermatogenic and progesterone activities.

PREPARATION.—11α-HYDROXY-6-DEHYDROPROGESTERONE

A medium was prepared of twenty grams of Edamine enzymatic digest of lactalbumin, three grams of corn steep liquor and fifty grams of technical dextrose diluted to one liter with tap water and adjusted to a pH of 4.3 to 4.5. Four liters of this sterilized medium was inoculated with Rhizopus nigricans minus strain, American Type Culture Collection No. 6227b, and incubated for 24 hours at a temperature of 28 degrees centigrade using a rate of aeration and stirring such that the oxygen uptake was 6.3 to 7 millimoles per hour per liter of $Na_2SO_3$ according to the method of Cooper, Fernstrom and Miller, Ind. Eng. Chem., 36, 504 (1944). To this medium containing a 24 hour growth of Rhizopus nigricans minus strain was added two grams of 6-dehydroprogesterone melting at 143 to 146.5 degrees centigrade in fifty milliliters of acetone to provide a suspension of the steroid in the culture. After an additional 24 hour period of incubation under the same conditions of temperature and aeration, the beer and mycelium were extracted. The mycelium was filtered, washed twice, each time with a volume of acetone approximately equal to the volume of the mycelium and extracted twice, each time with a volume of methylene chloride approximately equal to the volume of the mycelium. The acetone and methylene chloride extracts including solvent were added to the beer filtrate. The mixed extracts and beer filtrate were extracted successively with two one-half by volume portions of methylene chloride and then with two one-fourth by volume portions of methylene chloride. The combined methylene chloride extracts were washed with two one-tenth by volume portions of a two percent aqueous solution of sodium bicarbonate and then with two one-tenth by volume portions of water. After drying the methylene chloride with about three to five grams of anhydrous $Na_2SO_4$ per liter of solvent and filtering, the solvent was removed by distillation. The residue was dissolved in a minimum of methylene chloride, filtered and the solvent then evaporated. The resulting crystals were dried and then washed four times with ten milliliter portions of ether. The residue dissolved in 200 milliliters of benzene was chromatographed over 100 grams of alumina (washed with hydrochloric acid and heated to 120 degrees centigrade for four hours), using 200 milliliter portions of solvents as indicated in the table, yielding a fraction, eluate solids 9 through 22 inclusive, containing 2.181 grams of crystals. This fraction was dissolved in ten milliliters of acetone, filtered and concentrated on a steam bath to a volume of six milliliters. After remaining at room temperature for one hour, 415 milligrams of crystals melting at 143 to 157 degrees centigrade were recovered by filtration. The mother liquors were refrigerated to yield an additional 281 milligrams of crystals melting at 143 to 155 degrees centigrade. The solids from this latter mother liquor, obtained by evaporation of the solvent on a steam bath, were dissolved in two milliliters of acetone. Upon the addition of two milliliters of Skellysolve B petroleum ether, boiling point range of 60 to 71 degrees centigrade, crystallization ensued and 480 milligrams of crystals melting at 152 to 157 degrees centigrade were recovered. Refrigeration of the mother liquors resulted in an additional lot of crystals, 76 milligrams, melting at 143 to 158 degrees centigrade. All of the recovered crystals, 1.252 grams melting at 143 to 158 degrees centigrade were combined, and dissolved in four milliliters of methylene chloride. This solution was stirred with 0.1 gram of Magnesol magnesium silicate and filtered. The residue was washed three times with one milliliter portions of methylene chloride and the washings were added to the main filtrate. The combined methylene chloride solution was evaporated on a steam bath to two milliliters and then four milliliters of ether was added. Crystallization began and after one hour at room temperature, 1.074 grams of crystals melting at 155 to 158 degrees centigrade were recovered by filtration. Upon recrystallization from five milliliters of boiling methanol and refrigeration at four degrees centigrade for two days, 456 milligrams of crystals, melting at 160 to 162 degrees centigrade were obtained by filtration. Recrystallization from three milliliters of hot methanol yielded 213 milligrams of 11α-hydroxy-6-dehydroprogesterone crystals, melting at 160 to 162 degrees centigrade, E equals 20, 291, $[\alpha]_D^{24}$ of plus 111 degrees (1.063 in chloroform).

Infrared studies showed 11α-hydroxy-6-dehydroprogesterone to be a new compound and indicated the presence of one hydroxyl group confirmed by microcombustion data as follows:

*Analysis:*—Calculated for $C_{21}H_{28}O_3$: C, 76.78; H, 8.59. Found: C, 76.78; H, 8.56.

Table

| Fraction | Solvent | Eluate Solids, Milligrams |
|---|---|---|
| 1, 2 | benzene | |
| 3, 4 | benzene plus 5 percent ether | |
| 5, 6 | benzene plus 10 percent ether | 264 |
| 7 | benzene plus 50 percent ether | |
| 8 | do | |
| 9, 10 | ether | |
| 11, 12 | ether plus 5 percent chloroform | |
| 13, 14 | ether plus 10 percent chloroform | 2,251 |
| 15 | ether plus 50 percent chloroform | |
| 16-18 | do | |
| 9-22 | chloroform | |
| 23 | chloroform plus 5 percent acetone | 186 |

*Example 1.—11α-acetoxy-6-dehydroprogesterone*

A 47.5 milligram sample of 11α-hydroxy-6-dehydroprogesterone was dissolved in three milliliters of acetic anhydride and two milliliters of pyridine was added. After 48 hours at room temperature, the solution was diluted to 100 milliliters with water and extracted with 100, thirty, and thirty milliliter portions of ether. The combined ether extracts were washed with ten milliliters of water, twice with twenty milliliter portions of N HCl, ten milliliters of water, three times with thirty milliliter portions of seven percent sodium bicarbonate ($NaHCO_3$) solution and three times with twenty milliliter portions of water. The ether solution was then dried over anhydrous $Na_2SO_4$ and evaporated by a stream of air. The oily residue crystallized from 0.2 milliliter of methanol and 57 milligrams were obtained. This material was twice recrystallized from two milliliters of acetone to which ether was added drop by drop until crystals appeared. Crystals of 11α-acetoxy-6-dehydroprogesterone recovered weighed 31.8 milligrams, melting at 142 to 144 degrees centigrade, $[\alpha]_D^{23}$ of plus 108 degrees (1.149 in chloroform); ultraviolet maximum of 284 mmμ, k of 62.11, E of 23,010.

*Analysis:*—Calculated for $C_{23}H_{30}O_4$: C, 74.56; H, 8.16. Found: C, 74.25; H, 8.17.

*Example 2.—11α - propionyloxy - 6 - dehydroprogesterone*

In the same manner as Example 1, using the equivalent proportion of propionic anhydride in place of acetic anhydride produced 11α-hydroxy-6-dehydroprogesterone.

*Example 3.—11α-(β-cyclopentylpropionyloxy)-6-dehydroprogesterone*

In the same manner as Example 1, using the equivalent of β-cyclopentylpropionyl chloride in place of acetic anhydride produced 11α-(β-cyclopentylpropionyloxy)-6-dehydroprogerterone.

*Example 4.—11α-benzoxy-6-dehydroprogesterone*

In the same manner as Example 1, using the equivalent proportion of benzoyl chloride in place of acetic anhydride produced 11α-benzoxy-6-dehydroprogesterone.

*Example 5.—11α - octanoyloxy - 6 - dehydroprogesterone*

In the same manner as Example 1, using the equivalent proportion of octanoic anhydride in place of acetic anhydride produced 11α-octanoyloxy-6-dehydroprogesterone.

In a similar manner, 11α-acyloxy esters of 11α-hydroxy-6-dehydroprogesterone are prepared according to acylation procedures illustrated by the examples above or by reaction with ketene, ketenes of selected acids, selected acids, acid anhydrides, or acid chlorides, in an organic solvent such as pyridine or the like. Representative esters thus-prepared include one to eight carbon atom carboxylic acid acyloxy esters of saturated or unsaturated aliphatic, carbocyclic, cycloaliphatic, aryl, arylalkyl, algaryl, mono, di or polycarboxylic acids which form ester groups such as, for example, formyloxy, acetoxy, propionyloxy, butyryloxy, valeryloxy, hexanoyloxy, heptanoyloxy, octanoyloxy, benzoxy, phenylacetoxy, toluoyloxy, cyclopentylformyloxy, β-cyclopentylpropionyloxy, acrylyloxy, cyclohexylformyloxy, the half and di-esters of malonic, maleic, succinic, glutaric and adipic acids, and the like. The acids may also contain non-interfering substituents, such as mono or poly halo, chloro, bromo, hydroxy, methoxy, and the like if desired.

It is to be understood that the invention is not to be limited to the exact details of operation or exact compounds shown and described as obvious modifications and equivalents will be apparent to one skilled in the art and the invention is therefore to be limited only by the scope of the appended claims.

We claim:

1. A compound selected from the group consisting of 11α-hydroxy-6-dehydroprogesterone and 11α-acyloxy-6-dehydroprogesterone wherein acyloxy is a hydrocarbon-carbonyloxy radical containing from one to eight carbon atoms, inclusively.

2. 11α-hydroxy-6-dehydroprogesterone.

3. 11α-acyloxy-6-dehydroprogesterone wherein acyloxy is a hydrocarbon-carbonyloxy radical containing from one to eight carbon atoms, inclusively.

4. 11α-acetoxy-6-dehydroprogesterone.

5. 11α-propionyloxy-6-dehydroprogesterone.

6. 11α-(βcyclopentylpropionyloxy) - 6 - dehydroprogesterone.

7. 11α-benzoxy-6-dehydroprogesterone.

References Cited in the file of this patent

Fieser et al.: Natural Products Related to Phenanthrene, 3rd ed., page 551 (1949).